(12) United States Patent
Zhu

(10) Patent No.: US 11,082,326 B2
(45) Date of Patent: Aug. 3, 2021

(54) ROUTE SELECTION METHOD AND APPARATUS BASED ON HYBRID RESOURCE, AND SERVER THEREOF

(71) Applicant: CLOUDMINDS (SHENZHEN) ROBOTICS SYSTEMS CO., LTD., Shenzhen (CN)

(72) Inventor: Minghui Zhu, Shenzhen (CN)

(73) Assignee: CLOUDMINDS ROBOTICS CO., LTD., Shanghai (CN)

( * ) Notice: Subject to any disclaimer, the term of this patent is extended or adjusted under 35 U.S.C. 154(b) by 14 days.

(21) Appl. No.: 16/831,724

(22) Filed: Mar. 26, 2020

(65) Prior Publication Data
US 2020/0228436 A1 Jul. 16, 2020

Related U.S. Application Data

(63) Continuation of application No. PCT/CN2017/104033, filed on Sep. 28, 2017.

(51) Int. Cl.
*H04L 12/751* (2013.01)
*H04L 12/729* (2013.01)
(Continued)

(52) U.S. Cl.
CPC ........... *H04L 45/02* (2013.01); *H04L 45/125* (2013.01); *H04L 45/74* (2013.01); *H04L 47/78* (2013.01); *H04L 63/10* (2013.01)

(58) Field of Classification Search
CPC ....... H04L 45/02; H04L 45/125; H04L 45/74; H04L 47/78; H04L 63/10
(Continued)

(56) References Cited

U.S. PATENT DOCUMENTS 8,631,094 B1 * 1/2014 Alpert .................... G06F 17/10
709/219
8,914,505 B2 12/2014 Altshuler et al.
(Continued)

FOREIGN PATENT DOCUMENTS

CN 101051972 A 10/2007
CN 101267450 A 9/2008
(Continued)

OTHER PUBLICATIONS

International Search Report dated Jun. 14, 2018; PCT/CN2017/104033.
(Continued)

*Primary Examiner* — Obaidul Huq

(57) ABSTRACT

A route selection method based on hybrid resources, the route selection method being applied to a server, the server being communicably connected to a multi-node network, the multi-node network including at least two network nodes, wherein the method includes: constructing a directed graph for the multi-node network, and constructing a directed edge for each of the at least two network resources among the network resources if the at least two network resources are included between any two network nodes; and receiving node information of various network nodes, acquiring a delay weight value between any two network nodes under any network resource based on the node information, and assigning the delay weight value to a corresponding directed edge.

20 Claims, 12 Drawing Sheets

Construct a directed graph is constructed for the multi-node network, wherein a directed edge is constructed for each of the at least two network resources among the network resources — 101

Receive node information of various network nodes, acquire a delay weight value between at two network nodes under any network resource based on the node information, and assign the delay weight value to a corresponding directed edge — 102

(51) Int. Cl.
*H04L 12/741* (2013.01)
*H04L 12/911* (2013.01)
*H04L 29/06* (2006.01)

(58) Field of Classification Search
USPC .......................................................... 370/254
See application file for complete search history.

(56) References Cited

U.S. PATENT DOCUMENTS

2005/0088978 A1* 4/2005 Zhang ..................... H04L 45/02
370/254
2016/0028609 A1   1/2016 Hui et al.
2016/0261495 A1* 9/2016 Xia ......................... H04L 45/12

FOREIGN PATENT DOCUMENTS

| CN | 101729353 A | 6/2010 |
| CN | 103024597 A | 4/2013 |
| CN | 106571947 A | 4/2017 |
| CN | 106572019 A | 4/2017 |

OTHER PUBLICATIONS

1st Office Action dated Jun. 1, 2020 by the CN Office; Appln.No. 201780003266.3.

* cited by examiner

US 11,082,326 B2

ROUTE SELECTION METHOD AND APPARATUS BASED ON HYBRID RESOURCE, AND SERVER THEREOF

CROSS-REFERENCE TO RELATED APPLICATION

This application is a continuation of International Application No. PCT/CN2017/104033, with an international filing date of Sep. 28, 2017, the entire contents of which are incorporated herein by reference.

TECHNICAL FIELD

Embodiments of the present application relate to the technical field of network communications, and in particular, relate to a route selection method and apparatus based on hybrid resources, and a server thereof.

BACKGROUND

In a network environment, multiple network resources are included between two network nodes, for example, an Internet link connection and a private link connection (for example, a physical optical fiber link connection). Users having different privileges may select different network resources. At present, when a directed graph is being defined for each network node, a directed edge may be only defined for one network resource between any two network nodes. For example, a directed edge may be only defined for an Internet resource or for a private resource.

During studies of the related art, the inventors have identified that the related art has at least the following problem: The current directed graph may only embody information of one network resource. When constructing a communication path, the route selection method cannot flexibly schedule network resources in the network.

SUMMARY

An embodiment of the present application provides a route selection method based on hybrid resources. The route selection method is applied to a server, the server being communicably connected to a multi-node network, the multi-node network including at least two network nodes, wherein the method includes: constructing a directed graph for the multi-node network, and constructing a directed edge for each of the at least two network resources among the network resources if the at least two network resources are included between any two network nodes; and receiving node information of various network nodes, acquiring a delay weight value between any two network nodes under any network resource based on the node information, and assigning the delay weight value to a corresponding directed edge.

Another embodiment of the present application provides a server. The server is communicably connected to a multi-node network, the multi-node network including at least two network nodes. The server includes: at least one processor; and a memory communicably connected to the at least one processor; wherein the memory stores instructions executable by the at least one processor, wherein, the instructions, when being executed by the at least one processor, cause the at least one processor to perform the steps of: constructing a directed graph for the multi-node network, and constructing a directed edge for each of the at least two network resources among the network resources if the at least two network resources are included between any two network nodes; and receiving node information of various network nodes, acquiring a delay weight value between any two network nodes under any network resource based on the node information, and assigning the delay weight value to a corresponding directed edge.

Still another embodiment of the present application provides a non-volatile computer-readable storage medium. The computer-readable storage medium is applied to a server, the server being communicably connected to a multi-node network, the multi-node network including at least two network nodes. The computer-readable storage medium stores computer-executable instructions, which, when being executed by the server, cause the server to perform the step of: constructing a directed graph for the multi-node network, and constructing a directed edge for each of the at least two network resources among the network resources if the at least two network resources are included between any two network nodes; and receiving node information of various network nodes, acquiring a delay weight value between any two network nodes under any network resource based on the node information, and assigning the delay weight value to a corresponding directed edge.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

For clearer descriptions of the objectives, technical solutions and advantages of the embodiments of the present application clearer, the technical solutions according to the embodiments of the present application are clearly and thoroughly described with reference to the accompanying drawings of the embodiments of the present application. Obviously, the described embodiments are merely exemplary ones, but are not all the embodiments of the present application. Based on the embodiments of the present application, all other embodiments derived by persons of ordinary skill in the art without any creative efforts shall fall within the protection scope of the present application.

Figure 1:
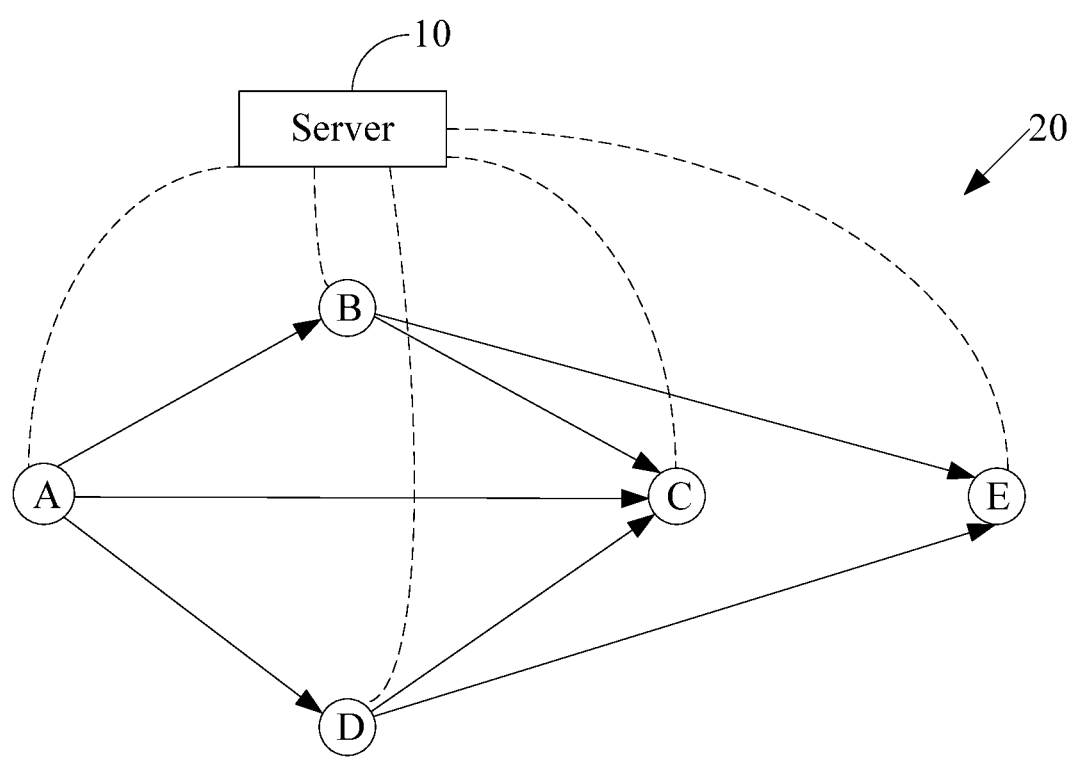
FIG. 1 is a schematic diagram of an application scenario of a route selection method and apparatus according to the present application.

A route selection method and apparatus based on hybrid resources according to the present application are suitable to an application scenario as illustrated in FIG. 1. The application scenario includes a multi-node network 20 and a server 10, wherein any network node in the multi-node network 20 is communicably connected to the server 10. The multi-node network 20 includes a plurality of network nodes. FIG. 1 only exemplarily illustrates a network node A, a network node B, a network node C, a network node D and a network node E. However, in a practical network environment, more other network nodes may be included. Each network node may support a routing function, and data may be sent and received between the network nodes. Each network node may be provided with a data acquiring apparatus (not illustrated in the drawings) configured to acquire data such as a bandwidth, a delay, a jitter and a packet loss rate and the like between two network nodes.

Figure 2:
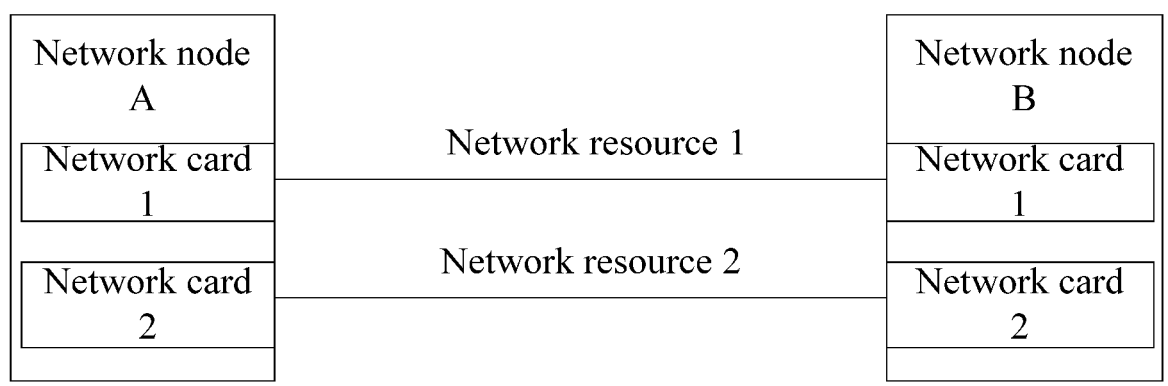
FIG. 2 is a schematic diagram of network nodes among which two network resources are included between two network nodes.

One or more network resources may be provided between each two network nodes. For example, as illustrated in FIG. 2, a network resource 1 and a network resource 2 may be provided between the network node A and the network node B, for example, an Internet resource and a private resource. A data packet may be transmitted from the network node A to the network node B via the network resource 1, or may be transmitted from the network node A to the network node B via the network resource 2.

The server 10 is configured to manage a transmission path of the data packet between the network nodes, and the server 10 may define a directed graph including one or more communication paths (referring to FIG. 1). When detecting or initiating a data packet transmission task, the server 10 constructs a transmission path of the data packet between a source network node and a destination network node based on the directed graph, and sends the transmission path to the corresponding network node, such that the corresponding network node forwards the data packet based on information of the transmission path. The server 10 is a device which provides services for computing, and includes a processor, a hard disk, a memory, a system bus and the like; the server is similar to the general computer in terms of architecture. However, since more reliable services need to be provided, higher requirements are imposed on the processing capability, stability, reliability, security, extensibility, manageability and the like of the device.

Specifically, when the server 10 constructs the directed graph, if at least two network resources are included between any two network nodes, a directed edge is constructed for each of at least two network resources among the network resources. The network nodes may periodically transmits the acquired bandwidth, delay, jitter, packet loss rate and the like data to the server 10, such that the server 10 obtains a delay weight value of any directed edge based on one or more values of the above data. Different from the related art, regardless of how many network resources are included between two network nodes, the directed edge is always constructed for one network resource. With this solution, information of at least two network resources may be simultaneously included in the directed graph, and a route selection algorithm may flexibly schedule the network resources in the network.

Figure 3:
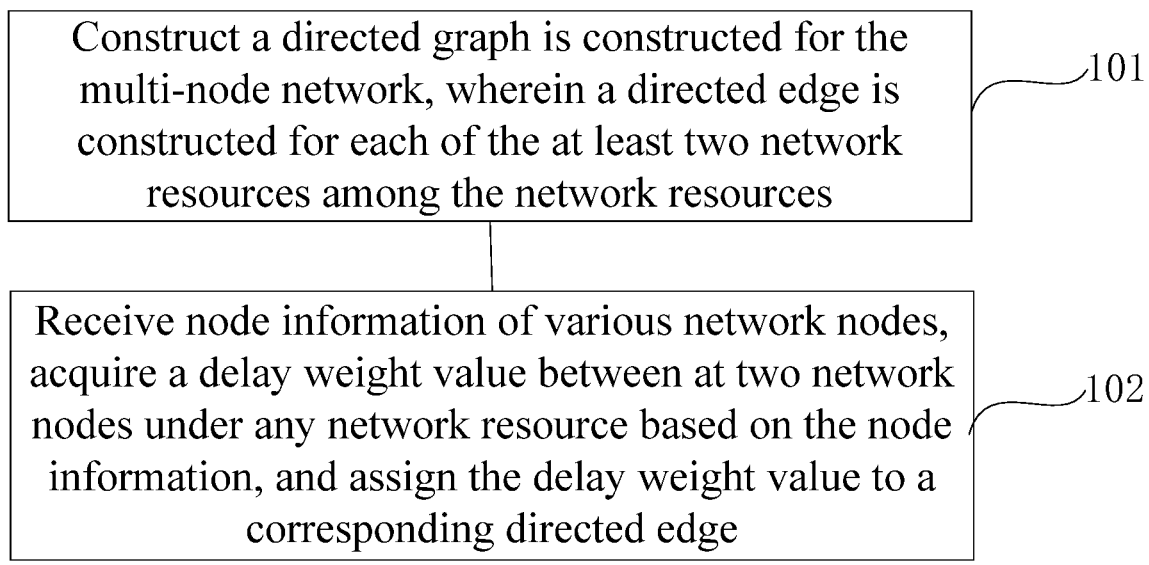
FIG. 3 is a flowchart of a route selection method according to an embodiment of the present application.

As illustrated in FIG. 3, an embodiment of the present application provides a route selection method based on hybrid resources, which may be performed by the server 10 as illustrated in FIG. 1. The route selection method includes the following steps:

101: A directed graph is constructed for the multi-node network, and if at least two network resources are included between any two network nodes, a directed edge is constructed for each of the at least two network resources among the network resources.

That is, a directed edge is constructed for each of any two network nodes. If only one network resource is provided between two network nodes, a directed edge is constructed for the network resource between the two network nodes; and if more than two network resources are included between two network nodes, at least two network resources are selected from the more than two network resources, and a directed edge is constructed for each of the at least two network resources. For example, as illustrated in FIG. 2, the network resource 1 and the network resource 2 are included between the network node A and the network node B, a directed edge may be constructed for each of the network resource 1 and the network resource 2. If more network resources are included between the network node A and the network node B, at least two network resources may be selected from the network resources and a directed edge is constructed for each of the selected at least two network resources. For example, if three network resources are included, two network resources may be selected and a directed edge may be constructed for each of the selected two network resources, or a directed edge may be constructed for each of all the three network resources.

The directed edge is an edge having a direction. For example, the directed edge between the network node A and the network node B may be A->B or B->A.

Optionally, the constructing the directed edge for each of at least two network resources if the at least two network resources are included between any two network nodes among the network resources includes:

defining logic nodes corresponding to the two network nodes, the logic node having an address, a delay weight value between the logic node and the corresponding network node being less than a second predetermined threshold;

wherein two end points of the directed edge of one network resource between the two network nodes are the two network nodes, and two end points of the directed edge of the other network resource are respectively the logic nodes corresponding to the two network nodes.

Figure 4:
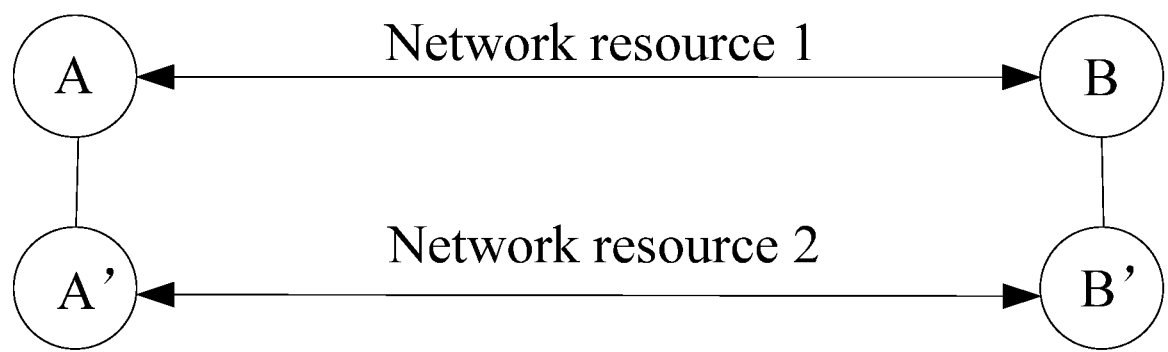
FIG. 4 is an exemplary diagram of a directed edge in the route selection method according to the present application.

That is, different end points may be defined for the directed edges of different network resources. Since there are only two network nodes, virtual logic nodes need to be defined. Using the scenario where the network resource 1 and the network resource 2 are included between the network node A and the network node B in FIG. 2 as an example, a logic node A' corresponding to the network node A, and a logic node B' corresponding to the network node B may be defined. The network node A and the network node B are used as two end points of the directed edge of the network resource 1, and the logic node A' and the logic node B' are used as two end points of the directed edge of the network resource 2. Reference may be made to FIG. 4.

The network node A and the logic node A' actually represent the same node. Therefore, a delay weight value between the network node A and the logic node A' may be defined as a small value, for example, 0.0001. Therefore, the second predetermined threshold may be 0.0001 or take an even smaller value. The case is the same for the network node B and the logic node B'. A network node and a corresponding logic node thereof may be represented by different IP addresses. For example, if the network resource 1 is an Internet resource and the network resource 2 is a private network resource, the network node A and the network node B may be represented by public network IP addresses, and the logic node A' and the logic node B' may be represented by intranet IP addresses.

102: Node information of various network nodes is received, a delay weight value between any two network nodes under any network resource is acquired based on the node information, and the delay weight value is assigned to a corresponding directed edge.

The node information may be one or more of bandwidth, delay, jitter and packet loss rate. For example, the node information includes a delay, a jitter and a packet loss rate from the network node A to the network node B. The server 10 calculates a delay weight value of the directed edge from the network node A to the network node B according to the delay, the jitter, and the packet loss rate.

With the route selection method according to the embodiment of the present application, when at least two network resources are included between two network nodes, a directed edge is constructed for each of the at least two network resources among the network resources. Information of the at least two network resources may be embodied in the directed graph, and the network resources in the network may be flexibly called.

Figure 5:
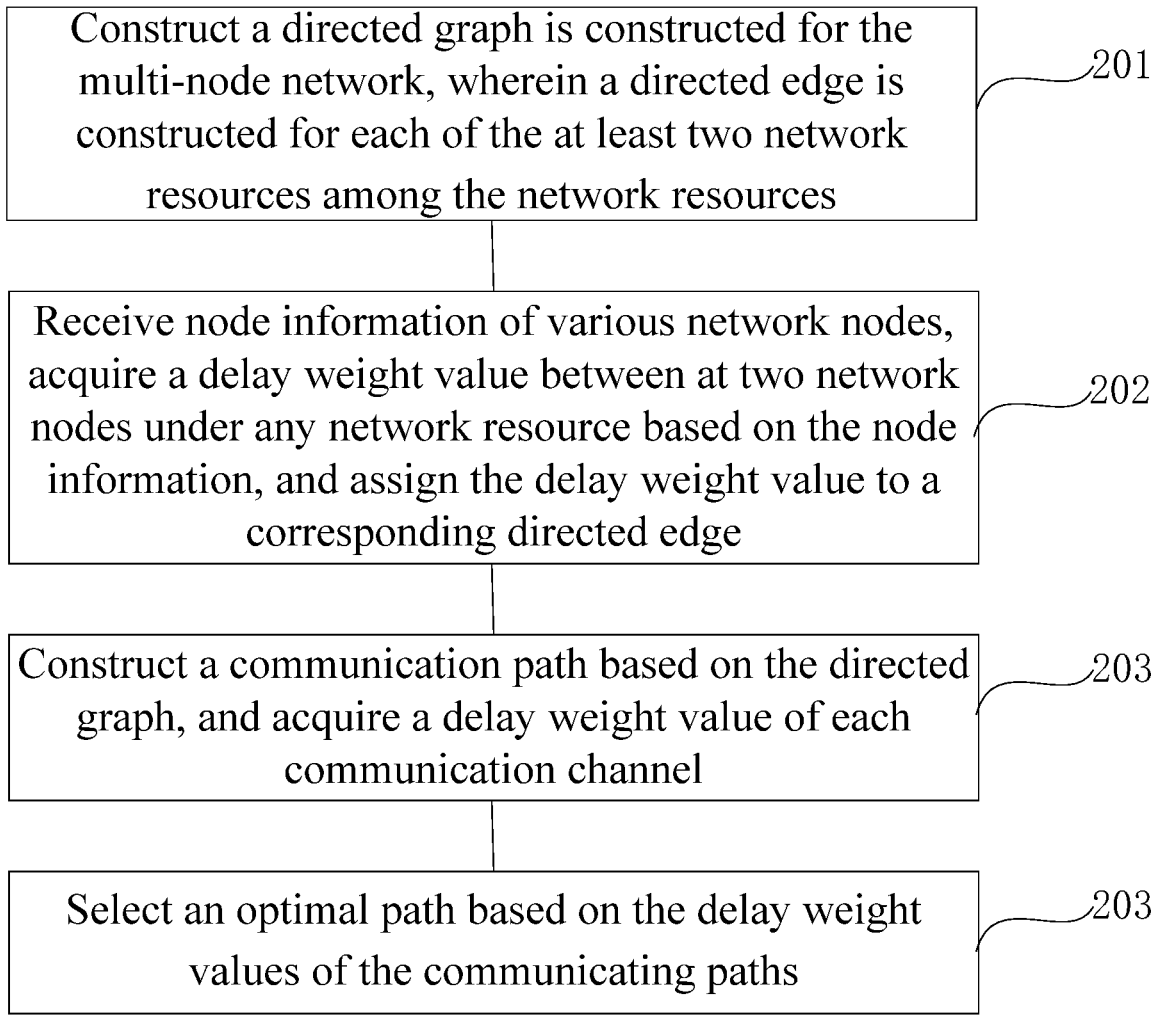
FIG. 5 is a flowchart of a route selection method according to an embodiment of the present application.

Optionally, as illustrated in FIG. 5, in other embodiments of the method, in addition to 201 and 201 (for details of 201 and 202, reference may be made to 101 and 102), the method further includes the following steps:

203: A communication path is constructed based on the directed graph, and a delay weight value of each communication channel is acquired.

204: An optimal path is selected based on the delay weight values of the communicating paths.

Figure 6:
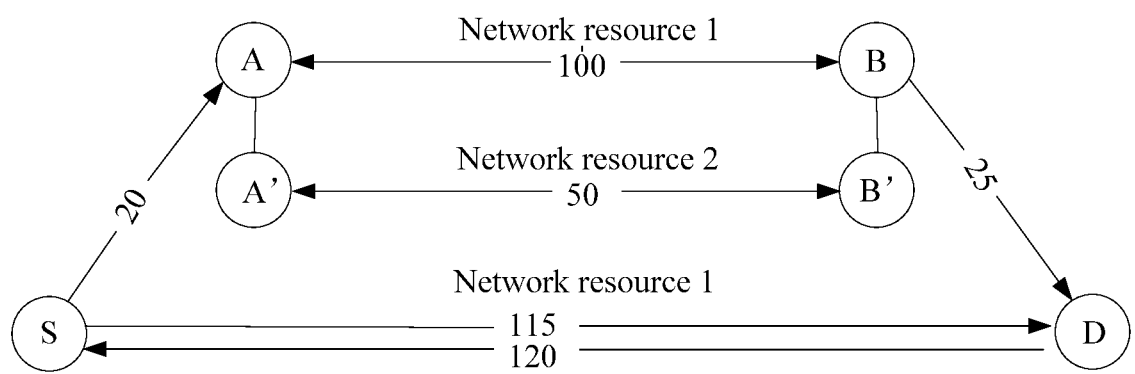
FIG. 6 is an exemplary diagram of a directed graph in the route selection method according to the present application.

Using the directed graph as illustrated in FIG. 6 as an example, if a communication path from a source network node S to a destination network node D needs to be constructed, three communication paths may be constructed, i.e., S->A->B->D, S->d, and S->A->A'->B'->B->D. The last communication path includes the network nodes and the logic nodes which may be combined. A combined path is S->A->B'->D. As illustrated in FIG. 6, through calculation, delay weight values of the three communication paths are 145, 115 and 95.

Based on a shortest path route selection algorithm, an optional path from the network node S to the network node D is S->A->B'->D.

According to the embodiment of the present application, when at least two network resources are included between two network nodes, a directed edge is constructed for each of the at least two network resources among the network resources. Information of the at least two network resources may be embodied in the directed graph, and an optimal path may be selected from paths including various network resources by using the route selection method, such that efficiency of data packet transmission is improved.

Figure 7:
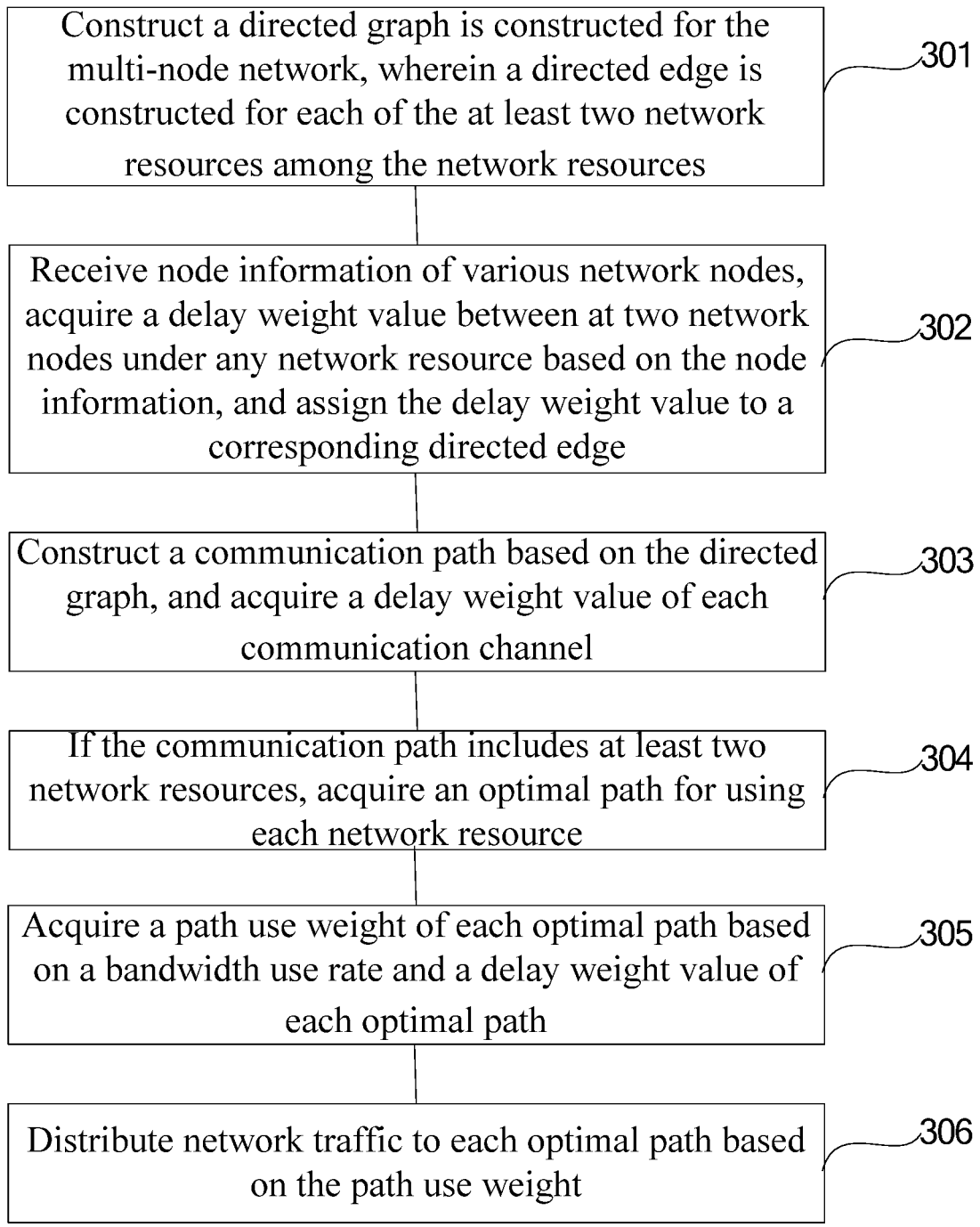
FIG. 7 is a flowchart of a route selection method according to an embodiment of the present application.

Optionally, in the directed graph of the hybrid resource path as illustrated in FIG. 6, the network resource 1 and the network resource 2 may also be simultaneously used from the network node S to the network node D, and traffic distribution therebetween is loaded balanced based on the delay weight value. As illustrated in FIG. 7, in other embodiments of the method, in addition to 301 and 302 (for details of 301 and 302, reference may be made to 101 and 102), the method further includes the following steps:

303: A communication path is constructed based on the directed graph, and a delay weight value of each communication channel is acquired.

Still using FIG. 6 as an example, the delay weight values of the three communication paths are acquired, i.e., S->A->B->D, S->D and S->A->B'->D are respectively 145, 115 and 95.

304: If the communication path includes at least two network resources, an optimal path for using each network resource is acquired.

An optimal path using the network resource 1 is S->D whose delay weight value is 115, and an optimal path using the network resource 2 is S->A->B'->D whose delay weight value is 95.

305: A path use weight of each optimal path is acquired based on a bandwidth use rate and a delay weight value of each optimal path.

The bandwidth use rate and the delay weight value may be simultaneously considered. If the bandwidth use rate of an optimal path is great, the traffic flowing through this path may be adaptively reduced; and if the delay weight value of an optional path is small, the traffic flowing through this path may be adaptively increased.

Specifically, if the bandwidth use rate of the optimal path exceeds a bandwidth use threshold, the path use weight of the optimal path is defined as a minimum threshold $W_{min}$; and otherwise, the path use weight of the optimal path is defined as:

$$W_i = \frac{V_i}{\Sigma_{i=0}^{n}(V_i)} \times (255 - W_{min});$$

wherein $$V_i = \sum_{i=0}^{n} x_i - x_i, x$$

denotes a delay weight value of each optimal path, i denotes a serial number of the optimal path, and n denotes the number of optimal paths.

Using FIG. 6 as an example, if neither of the bandwidth use rates of two optimal paths exceeds the bandwidth use threshold, the path use weights of the optimal paths S->D and S->A->B'->D are respectively:

$W_1=V_1/(V_1+V_2)\times(255-W_{min})$ and $W_2=V_2/(V_1+V_2)\times(255-W_{min})$, wherein $V_1=115+95-115=95$, $V_2=95+115-95=115$, and the value of $W_{min}$ may be predefined based on the actual needs.

306: Network traffic is distributed to each optimal path based on the path use weight.

According to the embodiment of the present application, when at least two network resources are included between two network nodes, a directed edge is constructed for each of the at least two network resources among the network resources. Information of at least two network resources may be embodied in the directed graph. During route selection, an optimal path using each network resource is selected based on the directed graph, and at least two network resources are simultaneously used for transmission of data packets. This may prevent over-high bandwidth use rate of a communication path, and further provide efficiency of data packet transmission.

Optionally, in other embodiments of the method, the method further includes:

when a network resource between any two network nodes fails, defining a delay weight value of a directed edge corresponding to the network resource between the two network nodes to be greater than a first predetermined threshold.

When a network resource between two network nodes fails, the delay weight value of the directed edge corresponding to the network resource may be defined to a greater value. In this route computing method, the path including the network resource may not be selected, and the route selection mechanism may seamlessly switch the link to another network resource to ensure normal transmission of data packets. For example, when the network resource 2 between the network node A and the network node B in FIG. 6 fails, the delay weight value of the directed edge A'->B' may be defined to a greater value. Therefore, the first predetermined threshold needs to take a greater value, for example, 100000. In practical application, the delay weight value of the directed edge A'->B' may be directly defined to be infinite.

Optionally, in other embodiments of the method, the method further includes:

if a user doses not have a privilege to use a network resource, defining a delay weight value of a directed edge of the user under the network resource to be greater than a first predetermined threshold.

During use of the network, some user does not have privileges to use a high-level network resource, and the delay weight value of the directed edge of the user under the high-level network resource may be defined to a greater value, for example, infinite, such that the route selection algorithm may not select the high-level network resource when processing a task of the user.

Figure 8:
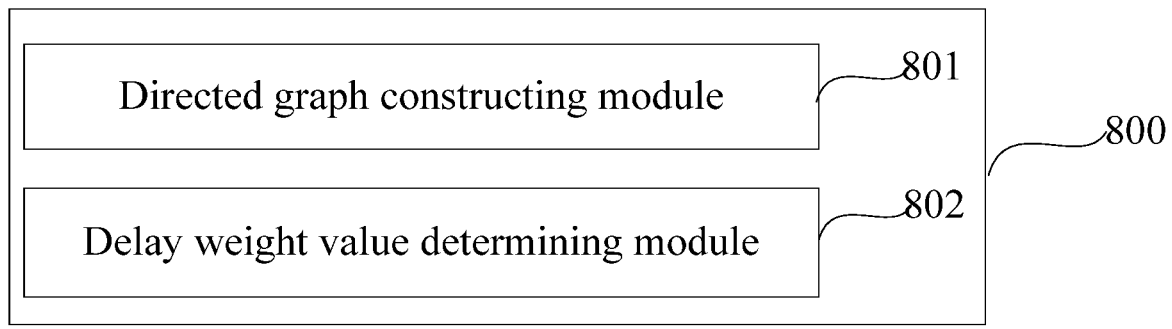
FIG. 8 is a schematic structural diagram of a route selection apparatus according to an embodiment of the present application.

Correspondingly, an embodiment of the present application provides a route selection apparatus 800 based on hybrid resources. The route selection apparatus is arranged in the server 10 as illustrated in FIG. 1. As illustrated in FIG. 8, the route selection apparatus 800 includes:

a directed graph constructing module 801, configured to construct a directed graph for the multi-node network, and if at least two network resources are included between any two network nodes, construct a directed edge for each of at least two network resources among the network resources; and a delay weight value determining module 802, configured to receive node information of various network nodes, acquire a delay weight value between any two network nodes under any network resource based on the node information, and assign the delay weight value to a corresponding directed edge.

With the route selection apparatus according to the embodiment of the present application, when at least two network resources are included between two network nodes, a directed edge is constructed for each of the at least two network resources among the network resources. Information of the at least two network resources may be embodied in the directed graph, and the network resources in the network may be flexibly called.

Figure 9:
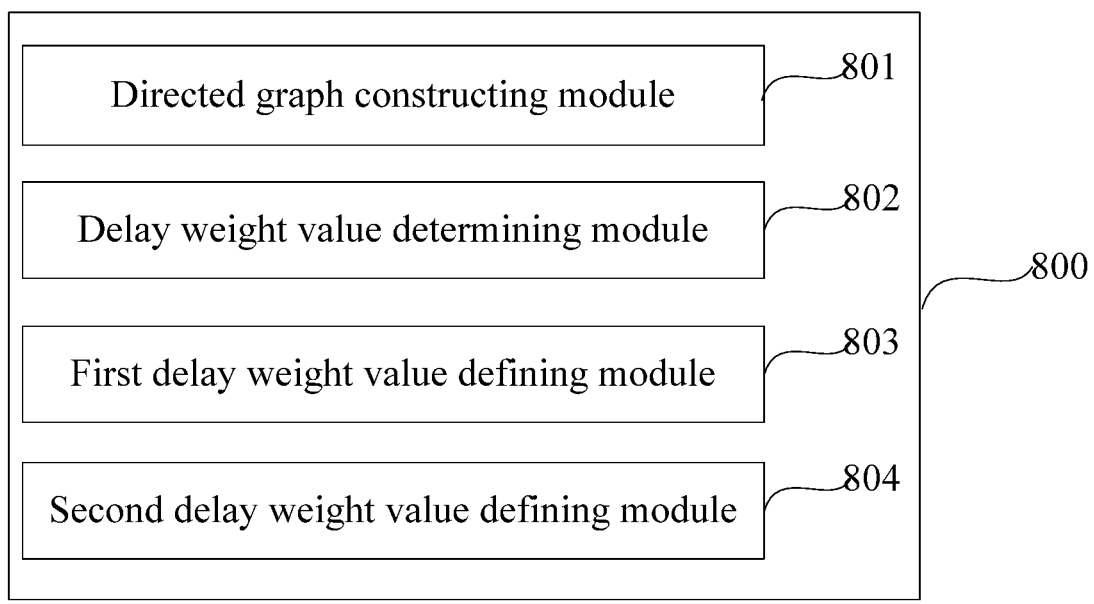
FIG. 9 is a schematic structural diagram of a route selection apparatus according to an embodiment of the present application.

Optionally, in some embodiments of the apparatus, as illustrated in FIG. 9, the route selection apparatus 800 further includes:

a first delay weight value defining module 803, configured to, when a network resource between any two network nodes fails, define a delay weight value of a directed edge corresponding to the network resource between the two network nodes to be greater than a first predetermined threshold.

Optionally, in some embodiments of the apparatus, as illustrated in FIG. 9, the route selection apparatus 800 further includes:

a second delay weight value defining module 804, configured to, if a user doses not have a privilege to use a network resource, define a delay weight value of a directed edge of the user under the network resource to be greater than a first predetermined threshold.

Optionally, in some embodiments of the apparatus, the directed graph constructing module 801 is specifically configured to:

define logic nodes corresponding to the two network nodes, the logic node having an address, a delay weight value between the logic node and the corresponding network node being less than a second predetermined threshold;

wherein two end points of the directed edge of one network resource between the two network nodes are the two network nodes, and two end points of the directed edge of the other network resource are respectively the logic nodes corresponding to the two network nodes.

Figure 10:
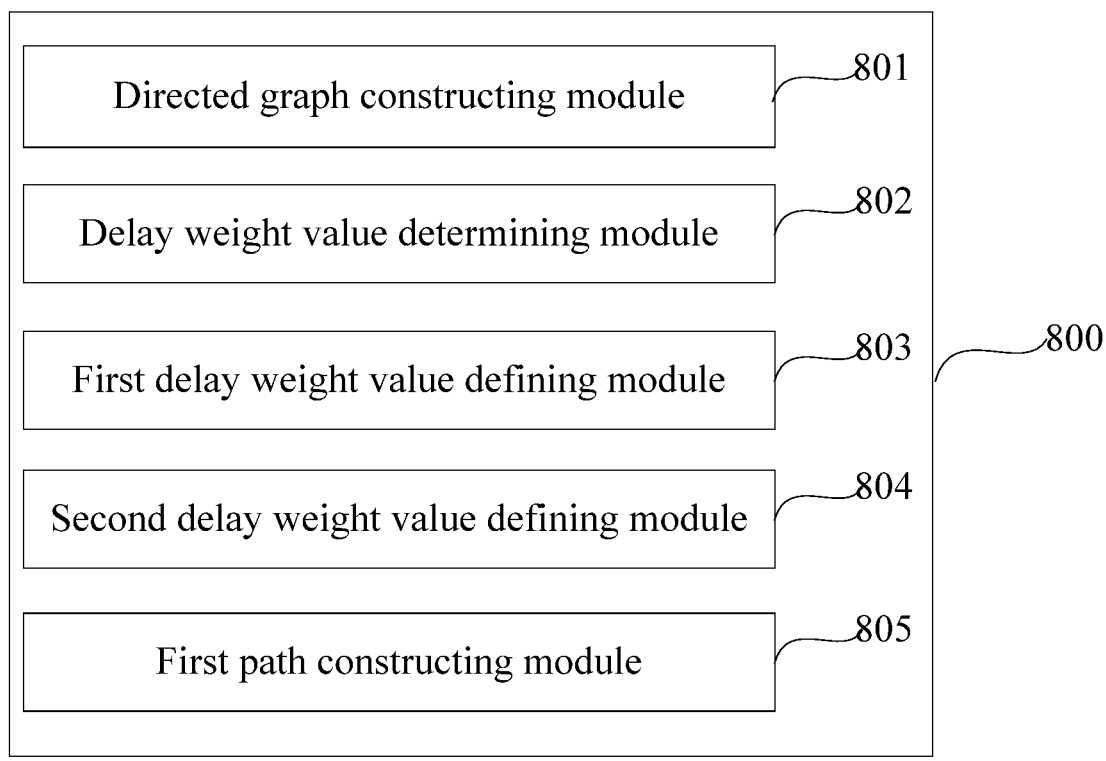
FIG. 10 is a schematic structural diagram of a route selection apparatus according to an embodiment of the present application.

Optionally, in other embodiments of the apparatus, as illustrated in FIG. 10, the route selection apparatus 800 further includes:

a first path constructing module 805, configured to:

construct a communication path based on the directed graph, and acquire a delay weight value of each communication channel; and select an optimal path based on the delay weight values of the communicating paths.

Figure 11:
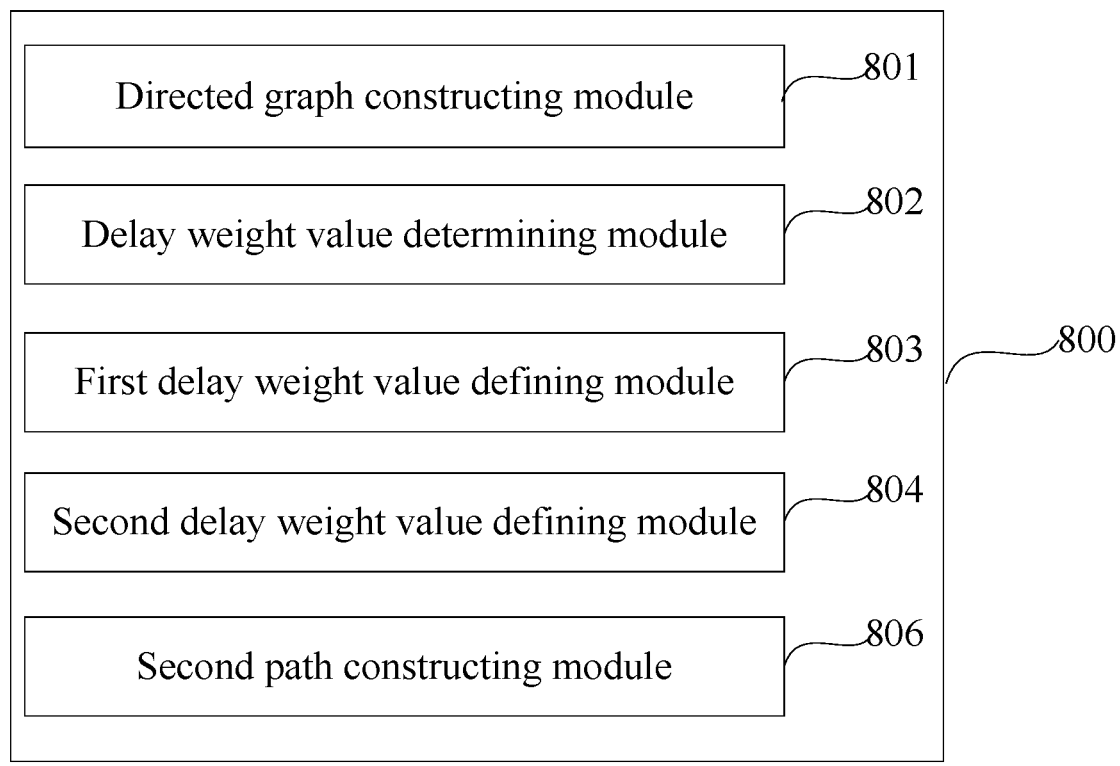
FIG. 11 is a schematic structural diagram of a route selection apparatus according to an embodiment of the present application.

Optionally, in other embodiments of the apparatus, as illustrated in FIG. 11, the route selection apparatus 800 further includes:

a second path constructing module 806, configured to:

construct a communication path based on the directed graph, and acquire a delay weight value of each communication channel; and if the communication path includes at least two network resources, acquire an optimal path for using each network resource;

acquire a path use weight of each optimal path based on a bandwidth use rate and a delay weight value of each optimal path; and distribute network traffic to each optimal path based on the path use weight.

Optionally, in some embodiments of the apparatus, the second path constructing module 806 is specifically configured to:

if the bandwidth use rate of the optimal path exceeds a bandwidth use threshold, define the path use weight of the optimal path as a minimum threshold $W_{min}$; and otherwise, define the path use weight of the optimal path as:

$$W_i = \frac{V_i}{\sum_{i=0}^{n}(V_i)} \times (255 - W_{min});$$

wherein $$V_i = \sum_{i=0}^{n} x_i - x_i, x$$

denotes a delay weight value of each optimal path, i denotes a serial number of the optimal path, and n denotes the number of optimal paths.

It should be noted that the above route selection apparatus may perform the route selection method according to the embodiments of the present application, has corresponding function modules for performing the method, and achieves the corresponding beneficial effects. For technical details that are not illustrated in detail in the embodiments of the route selection apparatus, reference may be made to the description of the route selection methods according to the embodiments of the present application.

Figure 12:
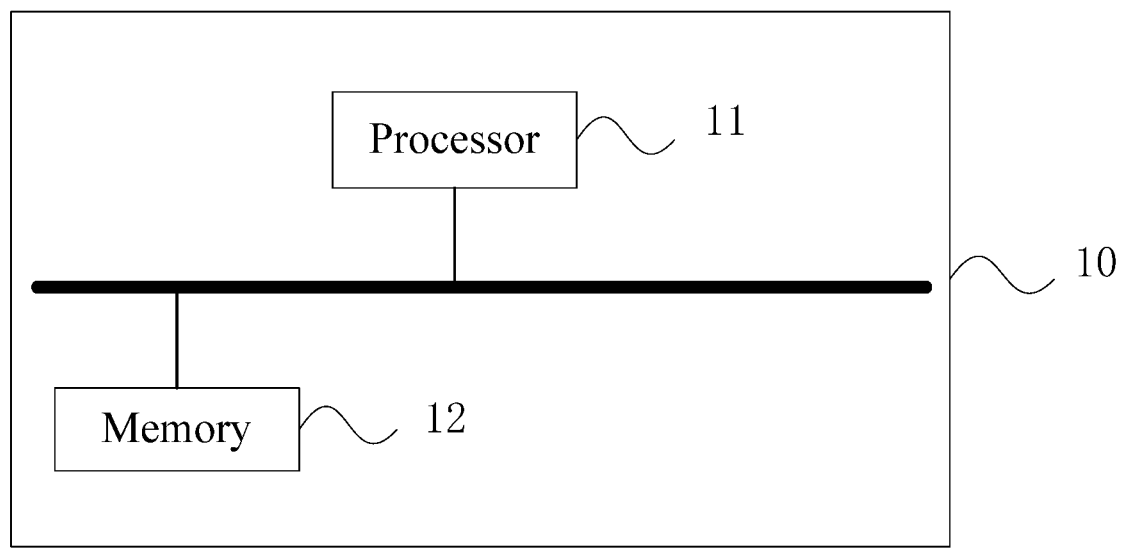
FIG. 12 is a schematic structural diagram illustrating hardware of a server according to an embodiment of the present application.

FIG. 12 is a schematic hardware structural diagram of a server 10 according to an embodiment of the present application. As illustrated in FIG. 12, the server 10 includes:

at least one processor 11 and a memory 12, and FIG. 12 uses one processor 11 as an example.

The at least one processor 11 and the memory 12 may be connected via a bus or in another manner, and FIG. 12 uses connection via the bus as an example.

The memory 12, as a non-volatile computer readable storage medium, may be configured to store non-volatile software programs, non-volatile computer executable programs and modules, for example, the program instructions/modules corresponding to the route selection methods in the embodiments of the present application (for example, the directed graph constructing module 801 as illustrated in FIG. 8). The non-volatile software programs, instructions and modules stored in the memory 12, when being executed, cause the processor 11 to perform various function applications and data processing of a server, that is, performing the route selection methods according to the above method embodiments.

The memory 12 may include a program memory area and data memory area, wherein the program memory area may store operation systems and application programs needed by at least function; and the data memory area may store data created according to the usage of the route selection apparatuses. In addition, the memory 12 may include a high speed random access memory, or include a non-volatile memory, for example, at least one disk storage device, a flash memory device, or another non-volatile solid storage device. In some embodiments, the memory 12 optionally includes memories remotely configured relative to the processor 11. These memories may be connected to the route selection apparatus over a network. Examples of the above network include, but not limited to, the Internet, Intranet, local area network, mobile communication network and a combination thereof.

One or more modules are stored in the memory 12, and when being executed by the at least one processor 11, perform the route selection method in any of the above method embodiments, for example, performing steps 101 to 102 in the method as illustrated in FIG. 3, steps 201 to 203 in the method as illustrated in FIG. 5, and steps 301 to 306 in the method as illustrated in FIG. 7; and implementing the functions of the modules 801 and 802 as illustrated in FIG. 8, modules 801 to 804 as illustrated in FIG. 9, modules 801 to 805 as illustrated in FIG. 10, and modules 801 to 804, and 806 as illustrated in FIG. 11.

The product may perform the method according to the embodiments of the present application, has corresponding function modules for performing the method, and achieves the corresponding beneficial effects. For technical details that are not illustrated in detail in this embodiment, reference may be made to the description of the methods according to the embodiments of the present application.

An embodiment of the present application provides a non-volatile computer-readable storage medium, wherein the computer readable storage medium stores computer-executable instructions, which, when being executed by at least one processor, for example, the processor 11 as illustrated in FIG. 12, cause the at least one processor to perform the route selection method in any of the above method embodiments, for example, performing steps 101 to 102 in the method as illustrated in FIG. 3, steps 201 to 203 in the method as illustrated in FIG. 5, and steps 301 to 306 in the method as illustrated in FIG. 7; and implementing the functions of the modules 801 and 802 as illustrated in FIG. 8, modules 801 to 804 as illustrated in FIG. 9, modules 801 to 805 as illustrated in FIG. 10, and modules 801 to 804, and 806 as illustrated in FIG. 11.

The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all of the modules may be selected according to the actual needs to achieve the objectives of the technical solutions of the embodiments.

According to the above embodiments of the present application, a person skilled in the art may clearly understand that the embodiments of the present application may be implemented by means of hardware or by means of software plus a necessary general hardware platform. Persons of ordinary skill in the art may understand that all or part of the steps of the methods in the embodiments may be implemented by a program instructing relevant hardware. The program may be stored in a computer readable storage medium and may be executed by at least one processor. When the program runs, the steps of the methods in the embodiments are performed. The storage medium may be any medium capable of storing program codes, such as read-only memory (ROM), a random access memory (RAM), a magnetic disk, or a compact disc-read only memory (CD-ROM).

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

What is claimed is:

1. A route selection method based on hybrid resources, the route selection method being applied to a server, the server being communicably connected to a multi-node network, the multi-node network comprising at least two network nodes, wherein the method comprises:
   constructing a directed graph for the multi-node network, and constructing a directed edge for each of the at least two network resources among the network resources if the at least two network resources are included between any two network nodes;
   receiving node information of various network nodes;
   acquiring a delay weight value between any two network nodes under any network resource based on the node information, and
   assigning the delay weight value to a corresponding directed edge.

2. The method according to claim 1, further comprising:
   when a network resource between any two network nodes fails, defining a delay weight value of a directed edge corresponding to the network resource between the two network nodes to be greater than a first predetermined threshold.

3. The method according to claim 1, further comprising:
   if a user doses not have a privilege to use a network resource, defining a delay weight value of a directed edge of the user under the network resource to be greater than a first predetermined threshold.

4. The method according to claim 1, wherein the constructing the directed edge for each of the at least two network resources among the network resources if the at least two network resources are included between any two network nodes comprises:
   defining logic nodes corresponding to the two network nodes, the logic node having an address, a delay weight value between the logic node and the corresponding network node being less than a second predetermined threshold;
   wherein two end points of the directed edge of one network resource between the two network nodes are the two network nodes, and two end points of the directed edge of the other network resource are respectively the logic nodes corresponding to the two network nodes.

5. The method according to claim 1, further comprising:
   constructing a communication path based on the directed graph;
   acquiring a delay weight value of each communication channel; and
   selecting an optimal path based on the delay weight values of the communicating paths.

6. The method according claim 1, further comprising:
   constructing a communication path based on the directed graph;
   acquiring a delay weight value of each communication channel;
   if the communication path comprises at least two network resources, acquiring an optimal path for using each network resource;
   acquiring a path use weight of each optimal path based on a bandwidth use rate and a delay weight value of each optimal path; and
   distributing network traffic to each optimal path based on the path use weight.

7. The method according to claim 6, wherein the acquiring the path use weight of each optimal path based on the bandwidth use rate and the delay weight value of each optimal path comprises:
   if the bandwidth use rate of the optimal path exceeds a bandwidth use threshold, defining the path use weight of the optimal path as a minimum threshold $W_{min}$; and
   otherwise, defining the path use weight of the optimal path as:

$$W_i = \frac{V_i}{\Sigma_{i=0}^n(V_i)} \times (255 - W_{min});$$

wherein $$V_i = \sum_{i=0}^n x_i - x_i, x$$

denotes a delay weight value of each optimal path, i denotes a serial number of the optimal path, and n denotes the number of optimal paths.

8. A server, the server being communicably connected to a multi-node network, the multi-node network comprising at least two network nodes, wherein the server comprises:
   at least one processor; and
   a memory communicably connected to the at least one processor; wherein
   the memory stores instructions executable by the at least one processor, wherein, the instructions, when being executed by the at least one processor, cause the at least one processor to perform the steps of:
   constructing a directed graph for the multi-node network, and constructing a directed edge for each of the at least two network resources among the network resources if the at least two network resources are included between any two network nodes;
   receiving node information of various network nodes;
   acquiring a delay weight value between any two network nodes under any network resource based on the node information, and
   assigning the delay weight value to a corresponding directed edge.

9. The server according to claim 8, wherein the instructions, when being executed by the at least one processor, further cause the at least one processor to perform the step of:
   when a network resource between any two network nodes fails, defining a delay weight value of a directed edge corresponding to the network resource between the two network nodes to be greater than a first predetermined threshold.

10. The server according to claim 8, wherein the instructions, when being executed by the at least one processor, further cause the at least one processor to perform the step of:
    if a user doses not have a privilege to use a network resource, defining a delay weight value of a directed edge of the user under the network resource to be greater than a first predetermined threshold.

11. The server according to claim 8, wherein the constructing the directed edge for each of the at least two network resources among the network resources if the at least two network resources are included between any two network nodes comprises:

defining logic nodes corresponding to the two network nodes, the logic node having an address, a delay weight value between the logic node and the corresponding network node being less than a second predetermined threshold;

wherein two end points of the directed edge of one network resource between the two network nodes are the two network nodes, and two end points of the directed edge of the other network resource are respectively the logic nodes corresponding to the two network nodes.

12. The server according to claim 8, wherein the instructions, when being executed by the at least one processor, further cause the at least one processor to perform the steps of:

constructing a communication path based on the directed graph;

acquiring a delay weight value of each communication channel; and selecting an optimal path based on the delay weight values of the communicating paths.

13. The server according to claim 8, wherein the instructions, when being executed by the at least one processor, further cause the at least one processor to perform the steps of:

constructing a communication path based on the directed graph;

acquiring a delay weight value of each communication channel;

if the communication path comprises at least two network resources, acquiring an optimal path for using each network resource;

acquiring a path use weight of each optimal path based on a bandwidth use rate and a delay weight value of each optimal path; and distributing network traffic to each optimal path based on the path use weight.

14. The server according to claim 13, wherein the acquiring the path use weight of each optimal path based on the bandwidth use rate and the delay weight value of each optimal path comprises:

if the bandwidth use rate of the optimal path exceeds a bandwidth use threshold, defining the path use weight of the optimal path as a minimum threshold $W_{min}$; and otherwise, defining the path use weight of the optimal path as:

$$W_i = \frac{V_i}{\Sigma_{i=0}^{n}(V_i)} \times (255 - W_{min});$$

wherein $$V_i = \sum_{i=0}^{n} x_i - x_i, x$$

x denotes a delay weight value of each optimal path, i denotes a serial number of the optimal path, and n denotes the number of optimal paths.

15. A non-volatile computer-readable storage medium, the computer-readable storage medium being applied to a server, the server being communicably connected to a multi-node network, the multi-node network comprising at least two network nodes, wherein the computer-readable storage medium stores computer-executable instructions, which, when being executed by the server, cause the server to perform the steps of:

constructing a directed graph for the multi-node network, and constructing a directed edge for each of the at least two network resources among the network resources if the at least two network resources are included between any two network nodes;

receiving node information of various network nodes;

acquiring a delay weight value between any two network nodes under any network resource based on the node information, and assigning the delay weight value to a corresponding directed edge.

16. The computer-readable storage medium according to claim 15, wherein the computer-readable storage medium stores computer-executable instructions, which, when being executed by the server, further cause the server to perform the step of:

when a network resource between any two network nodes fails, defining a delay weight value of a directed edge corresponding to the network resource between the two network nodes to be greater than a first predetermined threshold.

17. The computer-readable storage medium according to claim 15, the computer-readable storage medium stores computer-executable instructions, which, when being executed by the server, further cause the server to perform the step of:

if a user doses not have a privilege to use a network resource, defining a delay weight value of a directed edge of the user under the network resource to be greater than a first predetermined threshold.

18. The computer-readable storage medium according to claim 15, wherein the constructing the directed edge for each of the at least two network resources among the network resources if the at least two network resources are included between any two network nodes comprises:

defining logic nodes corresponding to the two network nodes, the logic node having an address, a delay weight value between the logic node and the corresponding network node being less than a second predetermined threshold;

wherein two end points of the directed edge of one network resource between the two network nodes are the two network nodes, and two end points of the directed edge of the other network resource are respectively the logic nodes corresponding to the two network nodes.

19. The computer-readable storage medium according to claim 15, wherein the computer-readable storage medium stores computer-executable instructions, which, when being executed by the server, cause the server to perform the steps of:

constructing a communication path based on the directed graph, and acquiring a delay weight value of each communication channel; and selecting an optimal path based on the delay weight values of the communicating paths.

20. The computer-readable storage medium according to claim 15, wherein the computer-readable storage medium stores computer-executable instructions, which, when being executed by the server, cause the server to perform the steps of:
    constructing a communication path based on the directed graph;
    acquiring a delay weight value of each communication channel;
    if the communication path comprises at least two network resources, acquiring an optimal path for using each network resource;
    acquiring a path use weight of each optimal path based on a bandwidth use rate and a delay weight value of each optimal path; and
    distributing network traffic to each optimal path based on the path use weight.

\* \* \* \* \*